United States Patent
Beyabani

(10) Patent No.: US 8,387,082 B2
(45) Date of Patent: Feb. 26, 2013

(54) ENHANCED VOICE-RICH INPUT FOR INTERACTIVE PROGRAMMING

(75) Inventor: Syed Zafar Beyabani, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 586 days.

(21) Appl. No.: 12/054,761

(22) Filed: Mar. 25, 2008

(65) Prior Publication Data

US 2009/0249414 A1 Oct. 1, 2009

(51) Int. Cl.
*H04N 7/16* (2011.01)
*H04N 7/173* (2011.01)
*G09B 5/00* (2006.01)
*G09B 3/00* (2006.01)

(52) U.S. Cl. ............ 725/13; 725/22; 725/131; 725/139; 434/169; 434/350

(58) Field of Classification Search .................. None
See application file for complete search history.

(56) References Cited

U.S. PATENT DOCUMENTS

| | | | | |
|---|---|---|---|---|
| 5,537,141 A * | 7/1996 | Harper et al. | ................. | 725/116 |
| 5,833,468 A * | 11/1998 | Guy et al. | ..................... | 434/350 |
| 5,915,973 A * | 6/1999 | Hoehn-Saric et al. | ........ | 434/350 |
| 6,226,611 B1 * | 5/2001 | Neumeyer et al. | ............ | 704/246 |
| 6,775,518 B2 * | 8/2004 | Norcott et al. | ................ | 434/350 |
| 7,257,557 B2 * | 8/2007 | Hulick | ............. | 705/50 |
| 8,033,831 B2 * | 10/2011 | Julia et al. | ..................... | 434/185 |
| 2006/0212917 A1 * | 9/2006 | Boucher et al. | ................ | 725/105 |
| 2006/0292530 A1 * | 12/2006 | Shpiro et al. | .................. | 434/185 |
| 2007/0298401 A1 * | 12/2007 | Mohanty et al. | ............. | 434/350 |
| 2009/0233264 A1 * | 9/2009 | Rogers et al. | ................. | 434/350 |
| 2011/0067045 A1 * | 3/2011 | Matheny et al. | ................ | 725/13 |

\* cited by examiner

*Primary Examiner* — Chris Parry

(57) ABSTRACT

A method may provide an interactive video program to a user, receive, by a video client, audio data from a microphone based on the user's interactive speech during the interactive video program, and send, by the video client, the audio data to another device to verify at least one of that the audio data corresponds to the user or that the user completes the interactive video program.

25 Claims, 7 Drawing Sheets

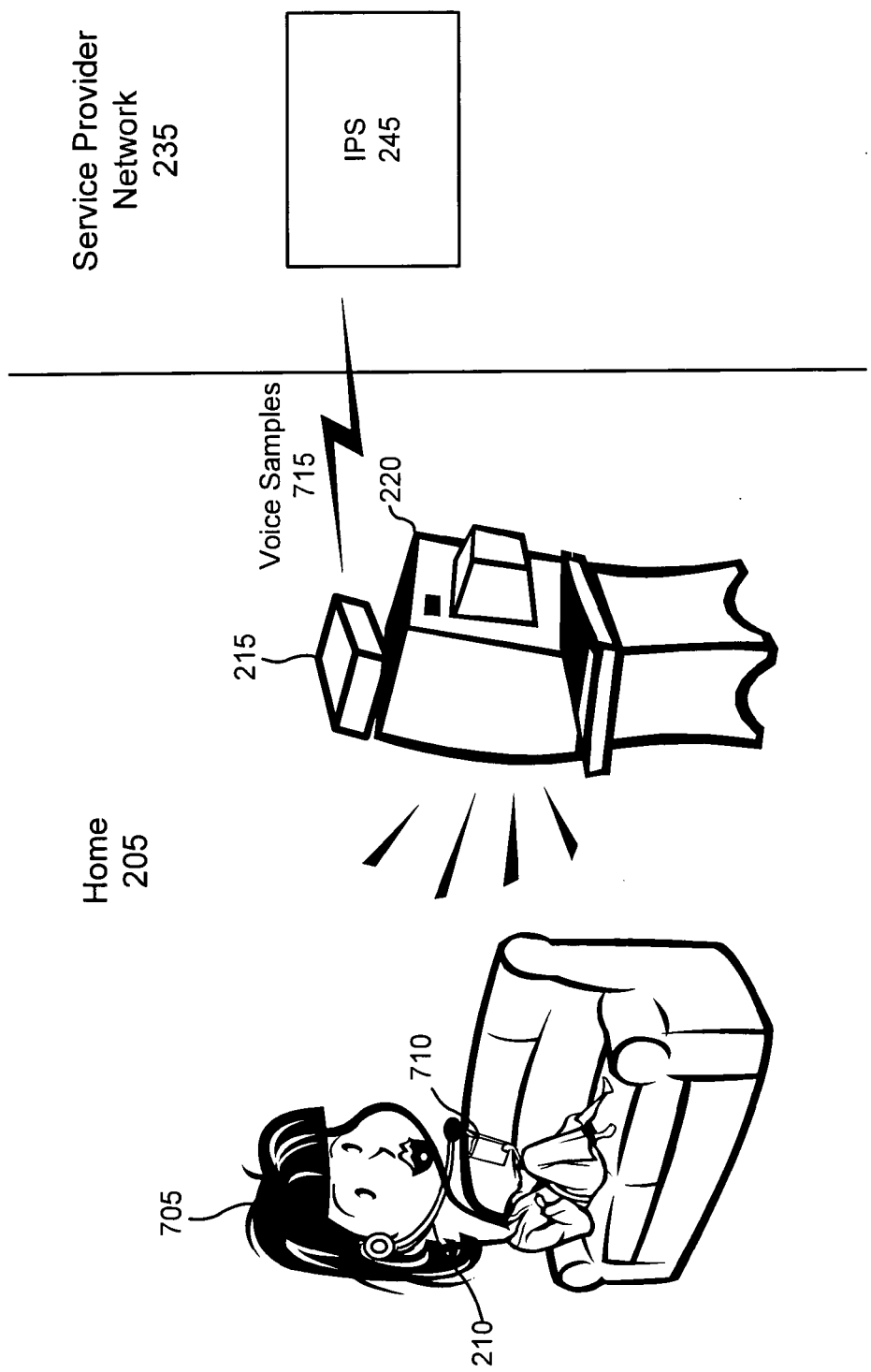

# US 8,387,082 B2

ENHANCED VOICE-RICH INPUT FOR INTERACTIVE PROGRAMMING

BACKGROUND

Interactive video programming (IVP) has become an attraction to many viewers since it provides a two-way communication platform. In this regard, IVP has been applied to a variety of media genres, such as entertainment and education.

To enhance the viewing experience, IVP may provide graphical information elements, such as icons, banners, labels, and/or menus, on the screen (e.g., by overlaying them). Based on this framework, a viewer's interaction may be limited to key inputs on, for example, a keyboard of a computer or a television remote control.

Depending on the type of program, other drawbacks may exist. For example, some educational programs may include IVP directed toward verifying completion of certain instruction blocks by displaying words or codes during the educational program. However, this type of IVP may be circumvented by the viewer and may not always provide the verification that was intended.

BRIEF DESCRIPTION OF THE DRAWINGS

FIG. 7 is diagram illustrating an example of the concepts described herein.

DETAILED DESCRIPTION OF PREFERRED EMBODIMENTS

The following detailed description refers to the accompanying drawings. The same reference numbers in different drawings may identify the same or similar elements. Also, the following description does not limit the invention.

The term "may" is used throughout this application and is intended to be interpreted as "having the potential to," or "being able to", and not in a mandatory sense (e.g., as "must"). The term "component," is intended to be broadly interpreted to include software, hardware, or a combination of hardware and software. The terms "a", "an", and "the" are intended to be interpreted to include one or more items. Where only one item is intended, the term "one" or similar language is used. Further, the phrase "based on" is intended to be interpreted as "based, at least in part, on," unless explicitly stated otherwise. The term "and/or" is intended to be interpreted to include any and all combinations of one or more of the associated list items.

Implementations described herein may provide a system having components that utilize audio data from a viewer to provide enhanced interactivity.

Figure 1:
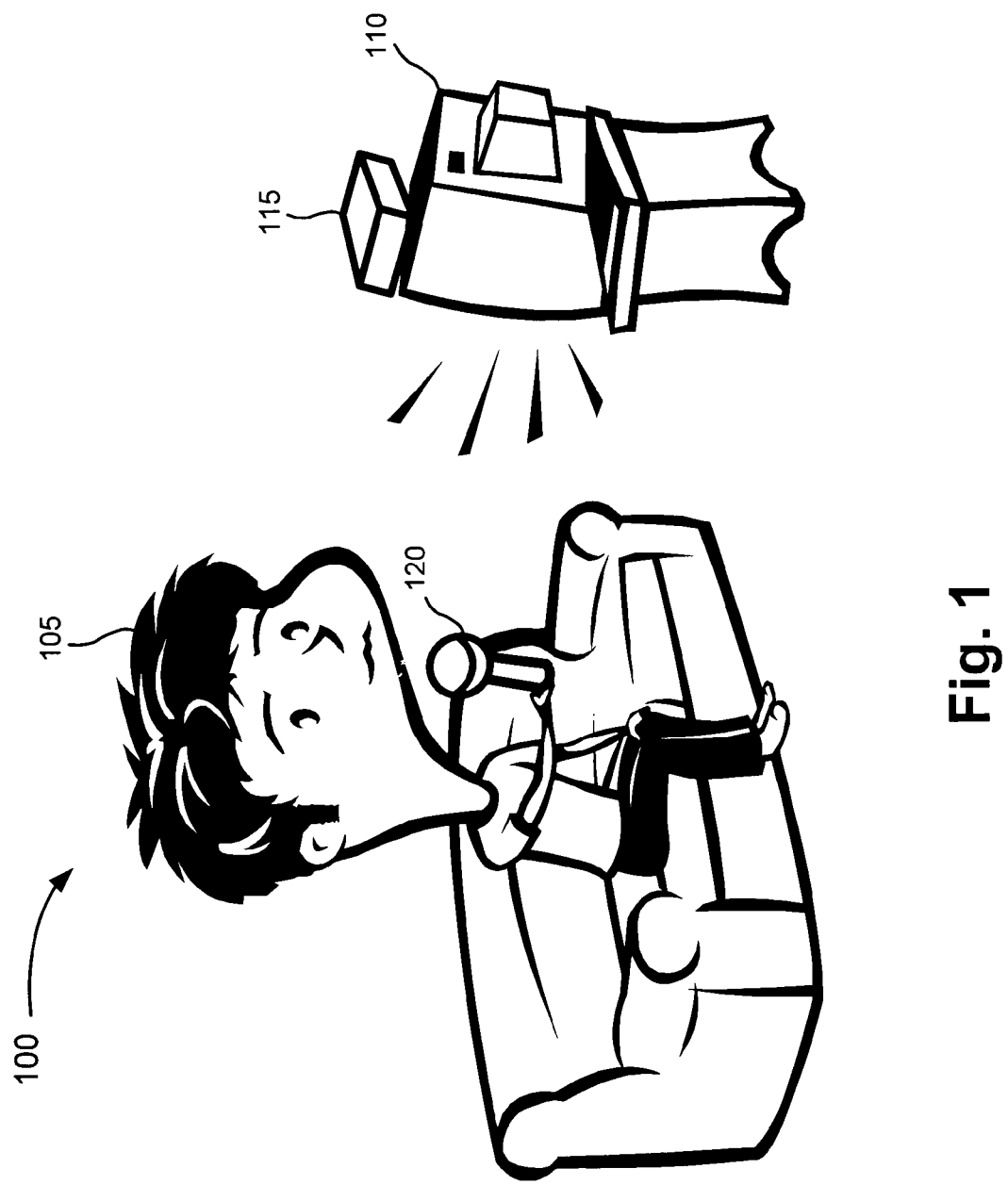
FIG. 1 is a diagram illustrating concepts described herein.

FIG. 1 is a diagram illustrating an exemplary environment 100. As illustrated, exemplary environment 100 may include a user 105, a television 110, a set top box (STB) 115, and a microphone 120. For purposes of discussion, assume that user 105 is watching a video-on-demand (VOD) instruction course on television 110. The instruction course may be designed for audio interactivity. User 105 may provide voice responses during the instruction course by speaking into microphone 120. For example, the instruction course may include, among other things, a voice participation segment or a student test segment. In such instances, the voice responses by user 105 may be sampled. The voice samples of user 105 may be used for, among other things, verification purposes. For example, the voice samples of user 105 may be used to verify that each response originated from user 105 (versus an individual other than user 105), and that user 105 actually viewed the entire instruction course. Thus, once the entire instruction course has aired, there may exist some form of verification that user 105 completed the entire instruction course.

As a result of the foregoing, environment 100 may provide the capability of verifying that user 105 satisfied instruction course requirements based on audio samples received via STB 115. Since environment 100 has been partially described, variations to the above concepts will be discussed further below. Additionally, the instruction course is an exemplary interactive video program applicable to the concepts described herein; however, other types of interactive video programs may be considered, as will be described further below.

Figure 2:
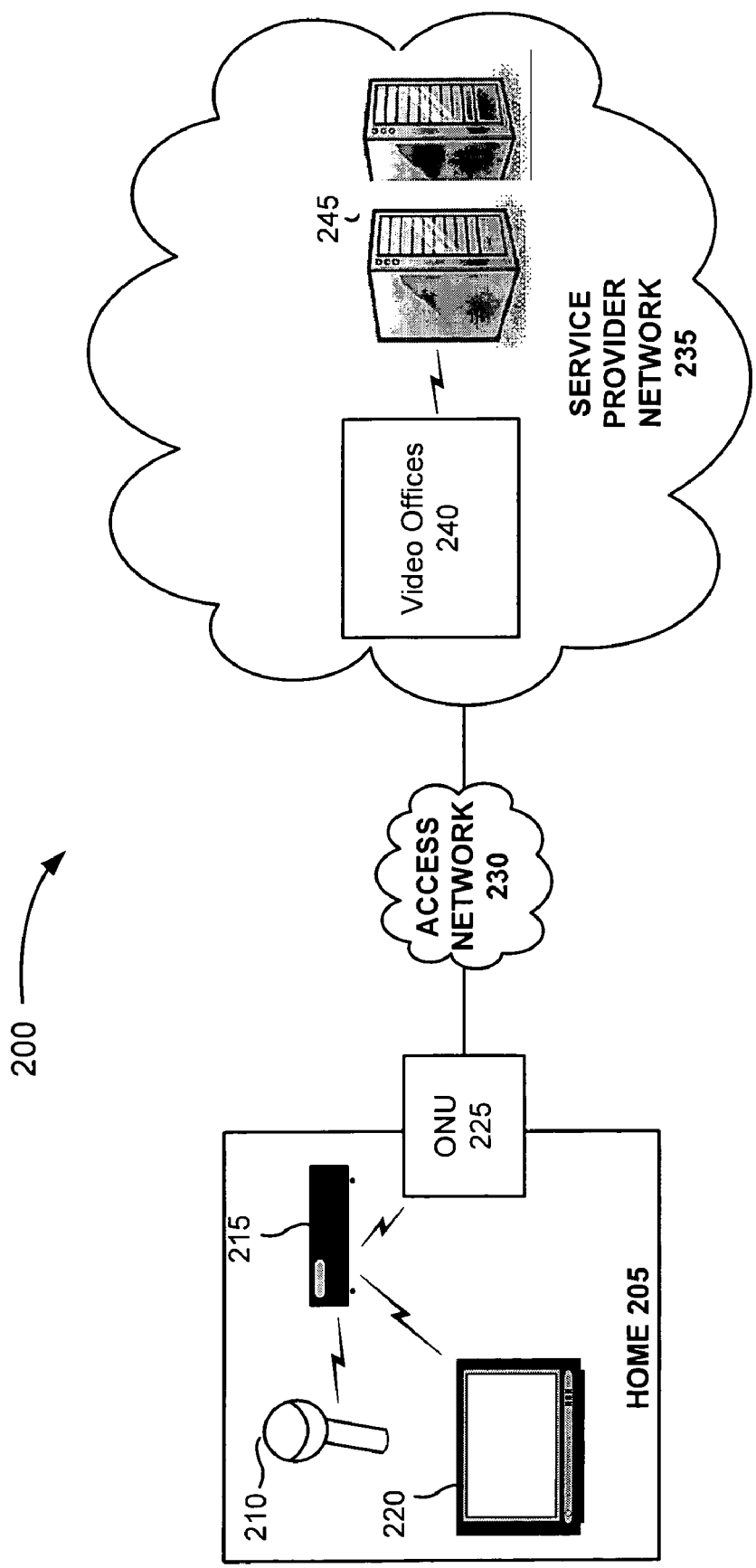
FIG. 2 is a diagram illustrating an exemplary environment in which systems and methods described herein may be implemented.

FIG. 2 is a diagram illustrating an exemplary environment 200 in which systems and methods described herein may be implemented. As illustrated, environment 200 may include a home 205, an access network 230, and a service provider network (SPN) 235. Home 205 may include a microphone 210, a video client 215, a display 220, and an optical network unit (ONU) 225. SPN 235 may include, among other things, one or more video offices 240 and an interactive program server (IPS) 245.

Home 205 may be a home network. Microphone 210 may include a device for receiving auditory information from a user. In one implementation, microphone 210 may be a portable device. For example, microphone 210 may include a handheld microphone, a remote control device having a microphone, a headset or a clip-on microphone. Microphone 210 may connect to video client 215 in a wired or wireless manner.

Video client 215 may include any device capable of receiving, transmitting and/or processing information to and/or from access network 230. Video client 216 may provide video signals to video display device 220, and may include decoding and/or decryption capabilities. Video client 215 may include a digital video recorder (DVR) (e.g., a hard drive). In one implementation, video client 215 may include a set top box. In another implementation, video client 215 may include a computer device, a cable card, a TV tuner card, a stationary device (e.g., a telephone or a computer), or a portable device (e.g., a mobile telephone or a personal digital assistant (PDA)). Video client 215 may be capable of providing interactive content to a user via video display device 220. Video client 215 may be capable of receiving input from a user via peripheral devices, such as microphone 210.

Video display device 220 may include any device capable of receiving and reproducing video signals. In one implementation, video display device 220 may include a television. In another implementation, video display device 220 may include, for example, a display of a stationary communication device (e.g., a computer monitor or a telephone), or a display of a portable communication device (e.g., a mobile telephone or a PDA). Video display device 220 may connect to video client 215 in a wired or wireless manner.

ONU 225 may include any device capable of providing an interface between home 205 and access network 230. For example, ONU 225 may convert optical signals to electrical signals, as well as other functions, such as multiplexing/demultiplexing, coding/decoding, modulating/demodulating, etc. ONU 225 may include channel plug-in units that provide a narrowband interface to customer premises equipment in home 205. OPN 225 may also connect to access network 230 (e.g., to central office (CO) equipment).

Access network 230 may include a video signaling and distribution network and system. Additionally, access network 230 may include, among other things, a firewall, filtering, a proxy, and/or network address translation mechanisms. Access network 230 may include, for example, a single network, such as a wide area network (WAN), a local area network (LAN), a telephone network (e.g., a public switched telephone network (PSTN) or a wireless network), the Internet, a satellite network, etc., or a combination of networks. Access network 230 may provide home 205 with video content provided by SPN 235.

SPN 235 may include a video signaling and distribution network. Video offices 240 may include video hub offices. For example, video hub offices may include broadcast systems and content for distribution, such as video-on-demand (VOD), an interactive program guide (IPG), and regional content. VOD may include content such as movies, television programs, sports, special interests, and/or educational content that may be viewed by a subscriber upon request (i.e., on-demand). IPG may include, for example, a listing and/or a schedule of programs available for viewing. Regional content may include, for example, news programs, independent channel programming, movies, sports programs, religious programs, music, and/or commercials.

Additionally, video offices 240 may include, for example, a super headend. A super headend may include broadcast systems and content for distribution. For example, a super headend may include broadcast systems to acquire, aggregate and distribute national content to video hub offices. National content may include, for example, television programs, movies, premier channel programming, news programs, sports programs, religious programs, music programs, and/or commercials.

IPS 245 may include any device capable of performing one or more operations associated with the concepts described herein. For example, IPS 245 may include a computational device, such as a computer. As will be described below, IPS 245 may, among other things, process audio data originating from microphone 210. IPS 245 may process the audio data originating from microphone 210 if, for example, an interactive program is being viewed. IPS 245 may also archive audio data. For example, IPS 245 may include mass storage devices.

Although, FIG. 2 illustrates exemplary environment 200, in other implementations, environment 200 may include fewer, additional, and/or different devices than the devices depicted in FIG. 2. For example, in other implementations, environment 200 may not include ONU 225. Additionally, or alternatively, in other implementations, devices may be combined into a single device. For example, video client 215 and video display device 220 may be combined into a single device, or microphone 210 and video display device 220 may be combined into a single device. Additionally, or alternatively a device may be implemented as two or more devices. For example, one or more functions of video client 215 (e.g., receiving microphone 210 input) may be performed by another device, such as a receiving device. Additionally, or alternatively, in other implementations, environment 200 may include a different arrangement and/or configuration than the arrangement and configuration depicted in FIG. 2. For example, while IPS 245 has been illustrated as a distinctive device from video offices 240, IPS 245 may be included with video offices 240. While some connections between devices in environment 200 are illustrated as being direct, in practice, any one of these connections may be indirect.

Figure 3:
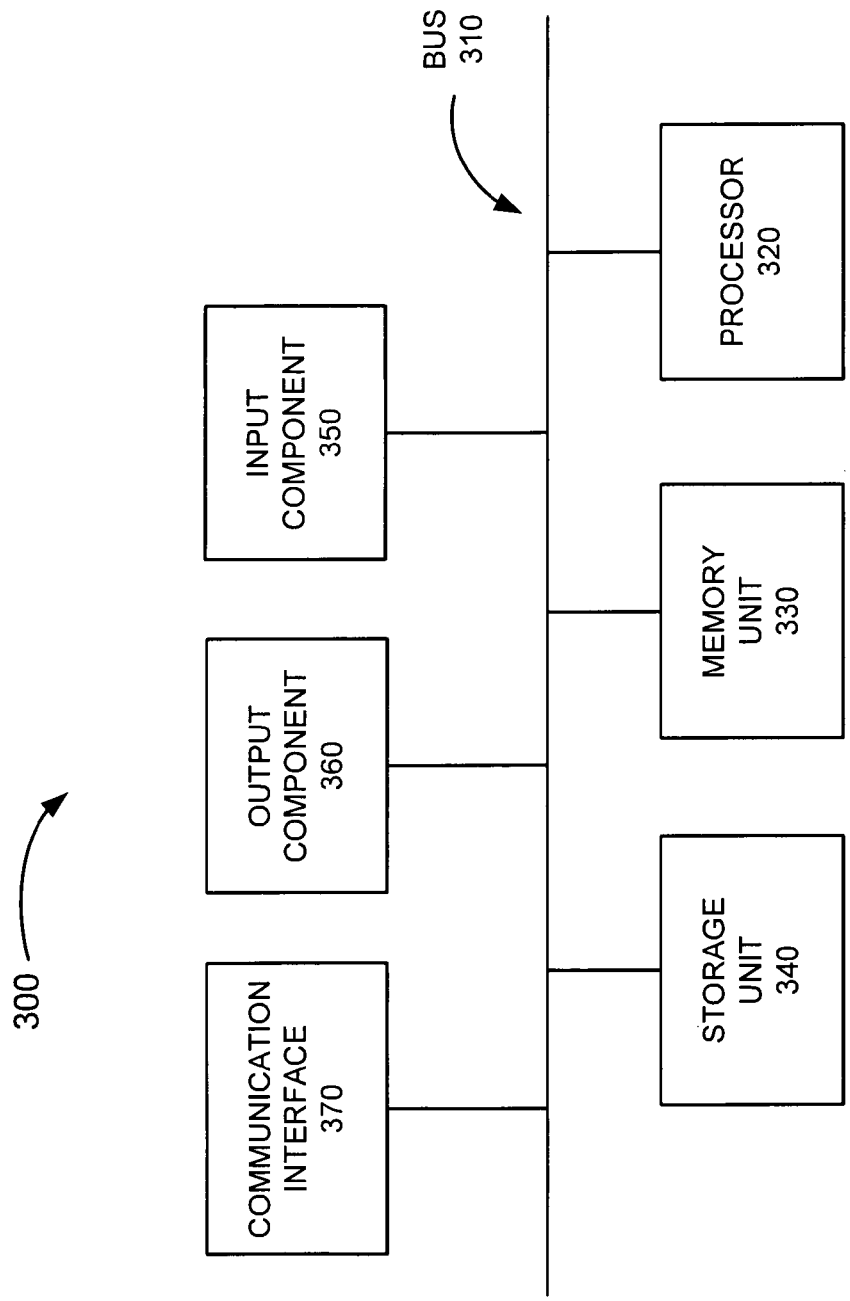
FIG. 3 is a diagram illustrating exemplary components that may correspond to one or more of the devices of the exemplary environment depicted in FIG. 2.

FIG. 3 is a diagram illustrating exemplary components of a device 300 that may correspond to one or more of the devices depicted in FIG. 2. For example, device 300 may correspond to microphone 210, video client 215, video display device 220, ONU 225, and/or IPS 245. As illustrated, device 300 may include a bus 310, a processor 320, a memory unit 330, a storage unit 340, an input component 350, an output component 360, and/or a communication interface 370.

Bus 310 may include a path that permits communication among the components of device 300. For example, bus 310 may include a system bus, an address bus, a data bus, and/or a control bus. Bus 310 may also include bus drivers, bus arbiters, bus interfaces, and/or clocks.

Processor 320 may include a general-purpose processor, a microprocessor, a data processor, a co-processor, a network processor, an application specific integrated circuit (ASIC), a controller, a programmable logic device, a chipset, a field programmable gate array (FPGA), or processing logic that may interpret and execute instructions. "Processing logic," as used herein, may include hardware, software, or a combination of hardware and software.

Memory unit 330 may include any unit that stores data and/or instructions related to the operation and use of device 300. For example, memory unit 330 may include a random access memory (RAM), a dynamic random access memory (DRAM), a static random access memory (SRAM), a synchronous dynamic random access memory (SDRAM), a ferroelectric random access memory (FRAM), a read only memory (ROM), a programmable read only memory (PROM), an erasable programmable read only memory (EPROM), an electrically erasable programmable read only memory (EEPROM), and/or a flash memory.

Storage unit 340 may include any unit that stores data, such as a hard disk (e.g., a magnetic disk, an optical disk, a magneto-optic disk, etc.), a compact disc (CD), a digital versatile disc (DVD), a floppy disk, a cartridge, a magnetic tape, another type of storage medium, or another type of computer-readable medium, along with a corresponding drive. The term "computer-readable medium" is intended to be broadly interpreted to include a physical or a logical memory device.

Memory unit 330 and/or storage unit 340 may also include a storage unit external to and/or removable from device 300, such as a Universal Serial Bus (USB) memory stick, a hard disk, etc.

Input component 350 may include a mechanism that permits a user to input information to device 300, such as a keyboard, a keypad, a mouse, a button, a switch, a microphone, voice recognition logic, etc. Output component 360 may include a mechanism that outputs information to a user, such as a display, a speaker, one or more light emitting diodes (LEDs), etc.

Communication interface 370 may include any transceiver-like mechanism that enables device 300 to communicate with other devices and/or systems. For example, communication interface 370 may include an Ethernet interface, an optical interface, a coaxial interface, a radio interface, or the like.

As will be described in detail below, device 300 may perform certain operations relating to the system and methods described herein. Device 300 may perform these operations in response to processor 320 executing software instructions contained in a computer-readable medium, such as memory unit 330.

The software instructions may be read into memory unit 330 from another computer-readable medium or from another device via communication interface 370. The software instructions contained in memory unit 330 may cause processor 320 to perform processes that will be described later. Alternatively, hardwired circuitry may be used in place of or in combination with software instructions to implement processes described herein. Thus, implementations described herein are not limited to any specific combination of hardware circuitry and software.

Although, FIG. 3 illustrates exemplary components of device 300, in other implementations, device 300 may include fewer, additional, and/or different components than those depicted in FIG. 3. In still other implementations, one or more components of device 300 may perform one or more other tasks described as being performed by one or more other components of device 300.

Figure 4:
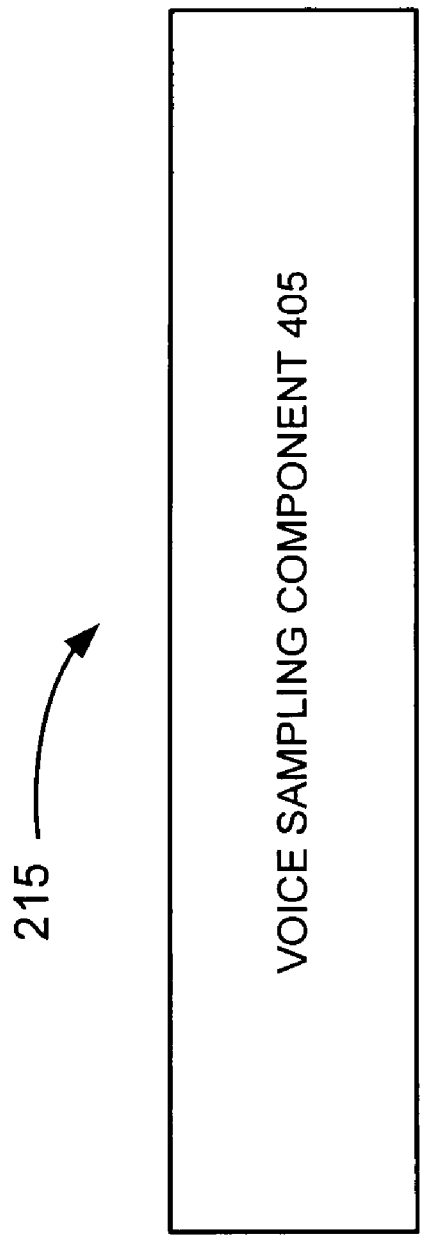
FIGS. 4 and 5 are diagrams illustrating exemplary components that may be associated with one or more devices depicted in FIG. 2.

FIG. 4 is a diagram illustrating a voice sampling component 405 that may be included with device 300. For example, video client 215 may include voice sampling component 405.

Voice sampling component 405 may include detecting, sampling and digitizing capabilities based on audio data originating from microphone 210. For example, voice sampling component 405 may detect when audio data is received from microphone 210. In this instance, voice sampling component 405 may sample the audio data and digitize the audio data into, for example, voice samples.

Voice sampling component 405 may also be configured to forward the voice samples to a backend component. For example, if audio data is digitized, voice sampling component 405 may direct, for example, communication interface 370, to forward the voice samples to, for example, IPS 245. IPS 245 may further process the voice samples, as will be described in detail below. In one implementation, the voice samples may be sent as part of a log message. In other implementations, the voice samples may be sent in other types of messages.

Although, FIG. 4 illustrates an exemplary voice sampling component 405 that may be associated with video client 215, in other implementations, one or more devices of environment 200 may perform one or more functions described as being performed by voice sampling component 405. Additionally, or alternatively, voice sampling component 405 may be included with a device other than, or in addition to, video client 215. For example, IPS 245 may include voice sampling component 405 to perform one or more of the functions described herein.

Figure 5:
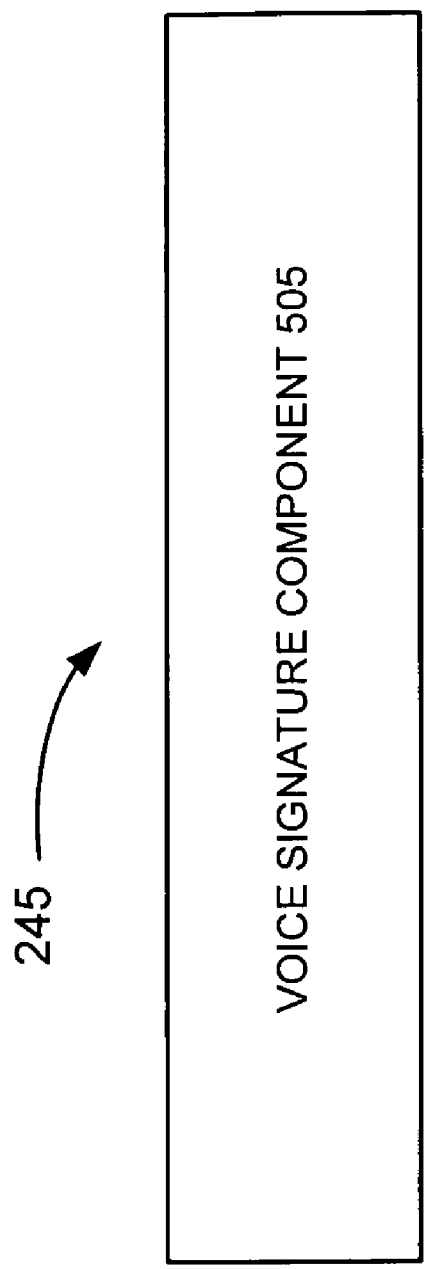

FIG. 5 is a diagram illustrating a voice signature component that may be included with device 300. For example, IPS 245 may include voice signature component 505.

Voice signature component 505 may include verification capabilities based on audio data (e.g., voice samples) originating from microphone 210. For example, voice signature component 505 may identify and/or verify that the voice samples correspond to a particular individual. In other instances, voice signature component 505 may include pronunciation capabilities. For example, voice signature component 505 may determine whether a user's pronunciation of a word or series of words corresponds to pre-stored voice samples. As will be described below, in this instance, a user may be learning a new language (e.g., French, Spanish, or Japanese). Additionally, or alternatively, voice signature component 505 may determine whether the voice samples provide, for example, a correct answer (e.g., in a test taking segment of a VOD program), or some other form of verification based on the content of the VOD program.

Although, FIG. 5 illustrates an exemplary voice signature component 505 that may be associated with IPS 245, in other implementations, one or more devices of environment 200 may perform one or more functions described as being performed by voice signature component 505. Additionally, or alternatively, voice signature component 505 may be included with a device other than, or in addition to, IPS 245. For example, video client 215 may include voice signature component 505 to perform one or more of the functions described herein.

Figure 6:
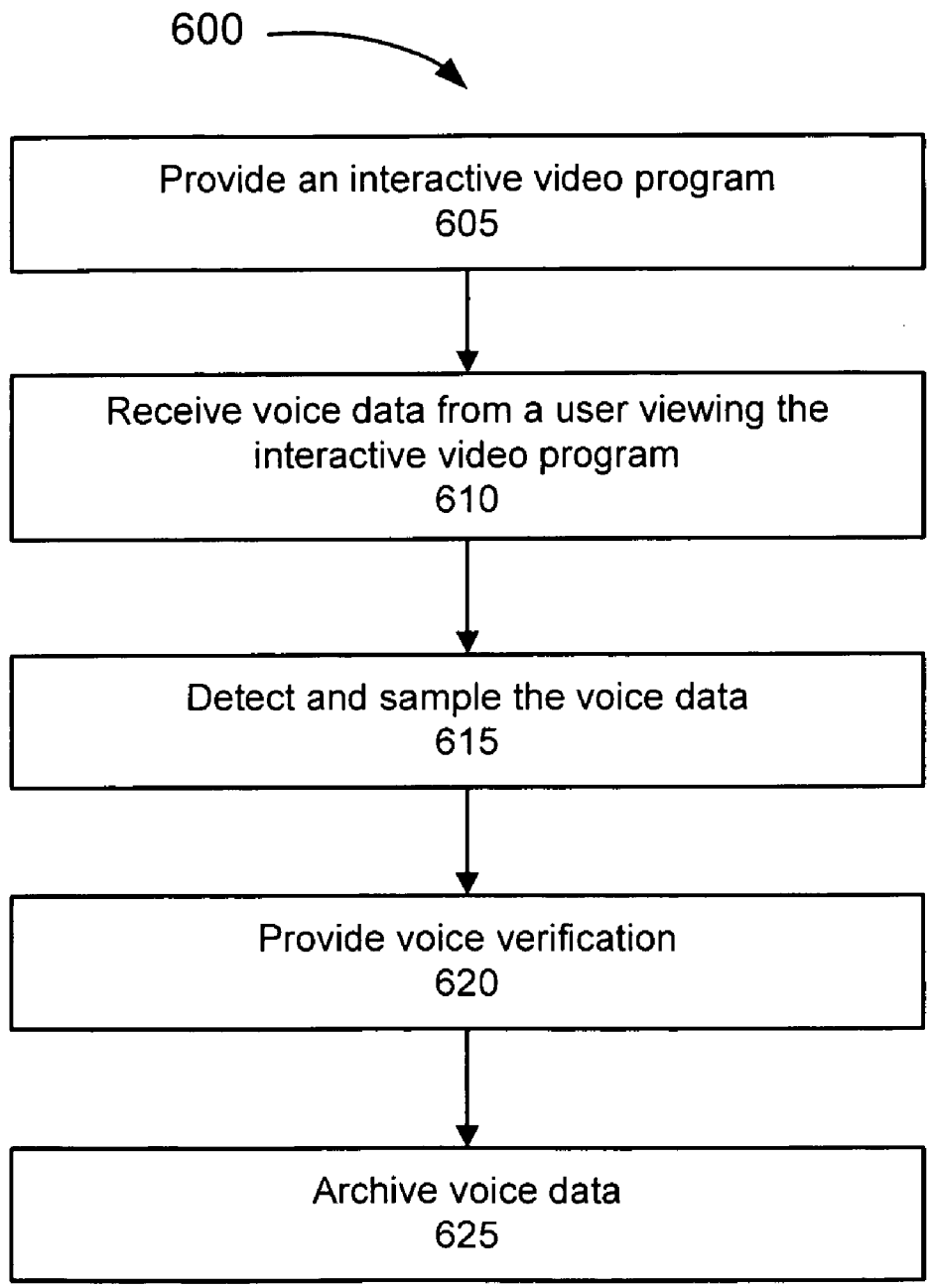
FIG. 6 flow is a diagram illustrating exemplary processes associated with the concepts described herein.

FIG. 6 is a flow diagram illustrating an exemplary process 600 that may be associated with the concepts described herein. In addition, process 600 will be described in connection with exemplary environment 200 illustrated in FIG. 2.

Process 600 may begin with providing an interactive video program (block 605). For example, a user in home 205 may request a VOD interactive video program via video client 215. Video client 215 may forward the VOD request, via ONU 225, to video offices 240. Video offices 240 may provide the interactive video program to the user via video display device 220. In other instances, the interactive video program may not be a VOD program. For example, the interactive video program may be a television show.

Voice data from a user viewing the interactive video program may be received (block 610). For example, the interactive video program may be designed for receiving auditory responses from a viewer. In such instances, the user may provide audio responses via microphone 210 to video client 215.

Depending on the interactive video program, the user's audio interaction may be different. For example, if the interactive video program is an instructional video, there may be quiz or test segments that allow for audio responses from the user. Additionally, or alternatively, the instructional video may include general participation segments. In such instances, the user may respond by speaking into microphone 210.

In other instances, entertainment-type programs may include IVP. For example, many new television shows, such as "American Idol" or "Dancing With The Stars," require viewers to vote. In such instances, the user may provide another form of audio response (e.g., speaking a number of a particular contestant).

Voice data may be detected and sampled (block 615). For example, when video client 215 receives the audio data, voice sampling component 405 may detect this input. Based on this detection, voice sampling component 405 may sample and digitize the audio data (signal) into voice samples. Additionally, voice sampling component 405 may forward the voice samples to IPS 245. For example, video client 215 may forward the voice samples via communication interface 370 to IPS 245.

Voice verification may be provided (block 620). For example, when IPS 245 receives the voice samples, voice signature component 505 may provide voice verification. Depending on the VOD program and/or what portion of the VOD program is being viewed (e.g., general participation portion, test portion, etc.), voice signature component 505 may perform different types of verification.

In one implementation, for example, when a user requests a VOD interactive video program, video offices 240 may provide IPS 245 with information, such as the VOD program selected and/or the Internet Protocol (IP) address of video client 215. Based on this information, IPS 245 may determine the type of verification process to perform when it receives messages containing voice samples from video client 215. As will be described below, in some instances, the type of verification processes may be the same throughout the entire VOD program. In other instances, the verification processes may change as the VOD program progresses.

Additionally, or alternatively, a device other than video offices 240 may provide information to IPS 245 so that IPS 245 may perform the proper voice verification operations on the received voice samples. For example, video client 215 may include information (e.g., flags) in the messages that contain the voice samples to indicate the proper voice verification operations to be performed. For example, video client 215 may receive signaling information from video offices 240 during the broadcasting of the VOD program. Additionally, or alternatively, video client 215 may include information in a message that does not contain the voice samples. For example, video client 215 may provide a message indicating the VOD program selected by the user to IPS 245 when the VOD program begins. In this way, IPS 245 may perform the proper verification operation based on knowledge of the VOD program.

Some VOD programs may require verification that a person completes the entire VOD program. In some instances, the VOD programs may be instructional videos and/or may be requirements for work-related training. For example, it is not uncommon for governmental workers to take classes relating to their jobs. Alternatively, the VOD program may include an instruction course associated with, for example, the Department of Motor Vehicles (DMV). In either case, verification that a person takes the course and completes the course may be desired. In such instances, voice signature component 505 may provide verification that the same person takes the course and completes the entire course. For example, the VOD program may include prompts for a user to speak. When this occurs, the voice samples may be compared to each other to determine whether the same person is providing the audio responses. That is, a first set of voice samples obtained during the beginning of the VOD program may be used for comparison against subsequent voice samples received as the VOD progresses.

In other instances, the VOD programs may not require verification that a person completes the entire VOD program. For example, a VOD program relating to learning a language may not impose this requirement.

Additionally, or alternatively, voice signature component 505 may provide verification that answers are correct (e.g., during a quiz or test portion of the VOD program), or whether one or more words are pronounced correctly (e.g., during a language learning VOD program).

In other instances, the interactive video program may not be a VOD program. For example, as previously described, the interactive video program may be a television show. In this instance, voice signature component 505 may verify a selection of a contestant (e.g., related to television show, such as American Idol), etc. In other words, voice signature component 505 may determine which contestant was selected based on the voice samples received. In this regard, depending on the interactive video program, voice signature component 505 may perform some form of processing based on the voice samples received from video client 215.

Returning to FIG. 6, voice data may be archived (block 625). Depending on, for example, the VOD program, there may be instances where the voice samples received by IPS 245 may be archived. For example, if the voice samples relate to a DMV course or a job-training course, the voice samples may be archived. For example, an employer may wish to maintain the audio data associated with an employee completing an instructional course for record purposes.

Although FIG. 6 illustrates an exemplary process 600, in other implementations, fewer, additional, or different processes may be performed. For example, depending on the interactive video program, the operations described in connection to block 625 may be omitted.

FIG. 7 is a diagram illustrating an example of the concepts described herein in connection with environment 200. For purposes of discussion, assume that a user 705, such as Loretta, is watching a VOD interactive program, such as "Learning A Second Language—Spanish Made Fun." Loretta is wearing microphone 210, such as a wireless headset, while taking notes in a notebook 710. As the program progresses, Loretta is prompted to repeat certain words in Spanish. Loretta speaks into microphone 210 and the audio data is detected by video client 215. Video client 215 generates voice samples 715 based on the audio data and transmits voice samples 715 to IPS 245 of SPN 235. In one implementation, IPS 245 may compare voice samples 715 to other audio data (e.g., spoken by the instructor). Based on the result of the comparison, IPS 245 may provide results on a correctness of voice samples 715 (e.g., in terms of pronunciation) to, for example, video offices 240 and/or video client 215. The results may be displayed on video display device 220.

The foregoing description of implementations provides illustration, but is not intended to be exhaustive or to limit the implementations to the precise form disclosed. In this regard, the concepts described herein may have broader application. For example, as described herein, a video client, such as a set top box, may be configured to collect audio data from a user and transmit this data to a backend component, such as a server, for further processing.

In addition, while series of blocks have been described with regard to the process illustrated in FIG. 6, the order of the blocks may be modified in other implementations. Further, non-dependent blocks may be performed in parallel.

It will be apparent that the exemplary model described herein may be implemented in many different forms of software, firmware, and hardware in the implementations illustrated in the figures. The actual software code or specialized control hardware used to implement the exemplary model does not limit the invention. Thus, the operation and behavior of the exemplary model were described without reference to the specific software code—it being understood that software and control hardware can be designed to implement the exemplary model based on the description herein.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the implementations described herein unless explicitly described as such.

What is claimed is:
1. A method, comprising:
providing, with a video client, an interactive video program to a user;
receiving, by the video client, audio data from a microphone based on interactive speech obtained from the user during the interactive video program;
sending, by the video client, the audio data to another device; and sending, by the video client to the other device, information to indicate a type of verification, out of multiple possible types of verifications, to be performed regarding the audio data, wherein the information is generated based on which portion of the interactive video program is currently being provided to the user, and the information includes a flag to indicate the type of verification to be performed out of the multiple possible types of verifications.

2. The method of claim 1, wherein the providing comprises:
providing the interactive video program that comprises an educational, video-on-demand interactive video program.

3. The method of claim 1, wherein the providing comprises:
providing the interactive video program that comprises a television show.

4. The method of claim 1, wherein the type of verification is to verify whether one or more words are pronounced correctly.

5. The method of claim 1, wherein the type of verification is to at least one of verify the user or whether the user completes the interactive video program.

6. The method of claim 1, further comprising:
verifying, by the other device, that the audio data corresponds to the user by comparing previous audio data obtained during the interactive video program.

7. The method of claim 1, further comprising:
archiving, by the other device, the audio data.

8. The method of claim 1, further comprising:
verifying, by the other device, that the audio data corresponds to a correct answer.

9. A non-transitory storage medium having stored thereon instructions, executable by at least one processor of a video client that provides an interactive video program on a display, the non-transitory storage medium comprising:
one or more instructions for providing the interactive video program on the display;
one or more instructions for detecting audio data based on speech, provided by a user, that relates to the interactive video program;
one or more instructions for sending the audio data to another device for determining whether the user satisfies requirements associated with viewing of the interactive video program; and
one or more instructions for sending information to the other device that indicates a type of verification, out of multiple possible types of verifications, to be performed regarding the audio data, wherein the information is generated based on which portion of the interactive video program is currently being provided to the display and the information includes a flag to indicate the type of verification to be performed out of the multiple possible types of verifications.

10. The non-transitory storage medium of claim 9, further comprising:
one or more instructions for determining the information to send to the other device based on a type of interactive video program being provided on the display.

11. The non-transitory storage medium of claim 9, wherein the requirements associated with viewing of the interactive video program include at least one of that the speech is provided by the user authorized to view the interactive video program or that the user authorized to view the interactive video program watches the entire interactive video program.

12. The non-transitory storage medium of claim 9, wherein the interactive video program comprises an instructional video program.

13. The non-transitory storage medium of claim 9, wherein the video client comprises a set top box.

14. The non-transitory storage medium of claim 9, further comprising:
one or more instructions for identifying the interactive video program; and wherein the sending comprises:
sending the information to the other device that indicates the type of verification to be performed regarding the audio data based on the identifying.

15. The non-transitory storage medium of claim 9, wherein the interactive video program comprises a contestant-based television show.

16. The non-transitory storage medium of claim 9, wherein the audio data relates to at least one of a test segment associated with the interactive video program or a general participation segment associated with the interactive video program.

17. A device, comprising:
a memory to store instructions; and
a processor to execute the instructions to:
receive a selection of an interactive video program from a user;
provide the selected interactive video program to the user;
receive speech data from the user via a microphone;
send the speech data to another device to determine whether a requirement associated with the viewing of the interactive video program is satisfied; and
send information to the other device that indicates a type of verification, out of multiple possible types of verifications, to be performed regarding the speech data, wherein the information is generated based on which portion of the interactive video program is currently being provided to the user and the information includes a flag to indicate the type of verification to be performed out of the multiple possible types of verifications.

18. The device of claim 17, wherein the requirement comprises that the speech data corresponds to the user.

19. The device of claim 17, wherein the processor further executes instructions to:
determine the information to send to the other device based on a type of interactive video program provided to the user.

20. The device of claim 17, wherein
the interactive video program comprises a television program.

21. The device of claim 17, wherein the interactive video program comprises a video on demand program.

22. The device of claim 17, wherein the device comprises a set top box.

23. A system comprising:
a video client device comprising:
a processor, and a memory including instructions, wherein when executed by the processor, the processor is configured to:
provide interactive video programs to a user on a display;
receive user speech via a microphone from the user;
format the user speech;
determine information to send to a server device that indicates a type of verification processing to be performed based on the interactive video programs displayed; and output the information and the user speech to the server for processing the user speech, wherein the information includes a flag to indicate the type of verification to be performed out of multiple possible types of verifications to be performed.

24. The system of claim 23, further comprising the server device, wherein the server device comprises a processor, and a memory including instructions, wherein when executed by the processor of the server device, the processor of the service device is configured to determine one or more of the following:

that the user speech corresponds to the user;
that the user speech corresponds to a correct answer; or
that the user speech corresponds to a properly pronounced word or series of words.

25. The system of claim 24, wherein the processor of the server device is further configured to archive the user speech for subsequent retrieval by someone other than the user.

* * * * *